Sept. 20, 1966       S. F. FAUNCE       3,273,741
AIR BARRIER MEANS FOR HYDROPNEUMATIC TANK
Filed May 4, 1962
FIG. 1
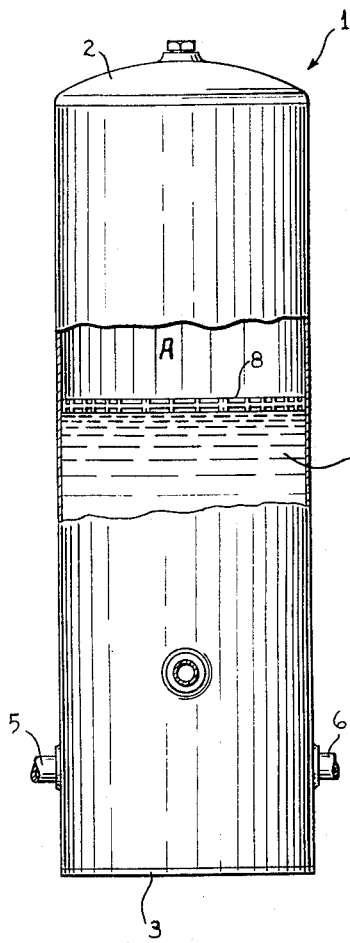
FIG. 2
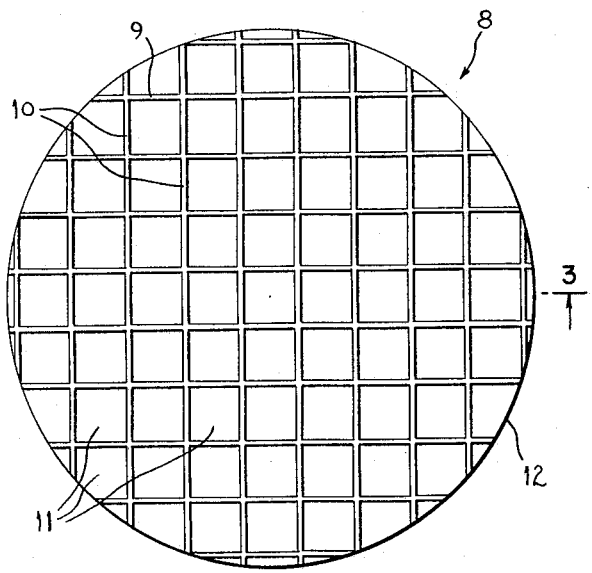
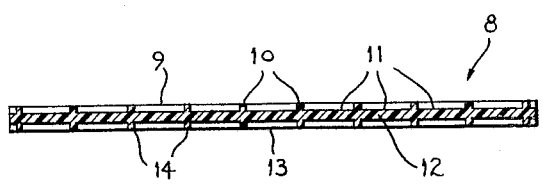
FIG. 3
INVENTOR
STUART F. FAUNCE
BY
ATTORNEY United States Patent Office 3,273,741
Patented Sept. 20, 1966

3,273,741
AIR BARRIER MEANS FOR HYDRO-
PNEUMATIC TANK
Stuart F. Faunce, Fanwood, N.J., assignor to John Wood
Company, New York, N.Y., a corporation of Delaware
Filed May 4, 1962, Ser. No. 192,491
7 Claims. (Cl. 220—26)

My invention relates to free floating air barrier means, and particularly to an air barrier float means for use in hydropneumatic tanks.

Hydropneumatic tanks are used to supply the necessary pressure for the delivery of water to various discharge outlets where the water supply is pumped from a water well. Although it would be possible to pump the water directly from the well supply to the discharge outlets, the intermittent and continuous operation of the pump whenever the valve means of any water outlet was opened would very materially decrease the expected life of the pump. Accordingly, in such systems a hydropneumatic tank is commonly used as a pressure water reservoir to deliver water under pressure to the dispensing outlets.

The air in the hydropneumatic tank is compressed by the water which is pumped into the tank. When a predetermined pressure is reached, the pump shuts off automatically by operation of a pressure switch, and the air under pressure in the upper portion of the tank will deliver water under pressure to the dispensing outlets. As the volume of water in the hydropneumatic tank decreases, the air above the water will expand and deliver water under pressure to the dispensing outlets. When the air pressure above the water drops to a predetermined value, the pressure switch will automatically cause the pump to operate to deliver additional water to the tank, and thus compress the air and increase the air pressure at the top of the tank.

As is well known in the art, in a water system using a hydropneumatic takn in which the air in the tank initially is at atmospheric pressure, water is introduced into the tank until the air pressure reaches approximately 40 p.s.i. When the pressure in the tank drops to approximately 20 p.s.i., the pump automatically comes on again and delivers water to the tank until the pressure is again raised to approximately 40 p.s.i., at which point the operation of the pump is automatically discontinued. The amount of water which may be withdrawn from the tank after the pump has automatically cut out will be approximately 15% of the total tank volume.

If the hydropneumatic tank be charged initially with air at 15 p.s.i., increased to 40 p.s.i., as above, the pump will likewise begin to operate again when the pump pressure drops to 20 p.s.i., and will cut out automatically when the pressure increases to 40 p.s.i. However, when the air in the hydropneumatic tank is precharged to ,say, 15 p.s.i., the amount of water which may be withdrawn before the pressure drops from 40 p.s.i. to 20 p.s.i. will be approximately 30% of the total tank volume.

As is well known in the art, the most commonly used hydropneumatic tank systems do not include an air barrier at the top of the water and the air under pressure at the top of the tank will be gradually absorbed by the water, thereby necessitating periodic replacement of the volume of air in the hydropneumatic tank. The use of a float of buoyant material to prevent absorption of the air by the water is old and well known, and such a float generally is disclosed in expired Gould Patent No. 1,116,414, granted November 10, 1914. The materials mentioned in this Gould patent are cork, wood, or other buoyant material. However, cork and wood become "water logged" eventually, and with such water logging will sink to the bottom of the tank.

The relatively recent very extensive commercial development of certain synthetic plastic materials such as expanded polystyrene, polyethylene, polypropylene, etc., which have a specific gravity of less than 1, has resulted in the commercial availability of relatively low cost materials for use in the production of floats of a character which do not become water logged in the same manner as the cork and wood floats mentioned in the Gould patent.

One of the disadvantageous features of prior art floats made of expanded polystyrene, etc., is that the float has a tendency to warp out of shape during use. The probable reason is that when polystyrene beads have been expanded to form unitary structures, the resultant packing of the bead causes different stacking planes when viewed from different directions. This causes different stress patterns to be set up in the resultant unitary structure, which frequently results in the warping of the unitary structure some time after removal from the mold.

Another disadvantageous feature of prior art floats made of expanded polystyrene, etc., is that they require the inclusion of some means, such as an upstanding pin near the periphery of the float, or a series of openings through the float, to cause the float to tip, or cant, sidewise to prevent it from being jammed at the top of the hydropenumatic tank in the event the water in the tank for any reason should forcibly move the float against the top closure of the tank.

One object of my invention is to provide a float of plastic material such as expanded polystyrene, etc., which is a of a construction which precludes the warping of the float during use in the tank. Another object of my invention is to provide a float of plastic material such as expanded polystyrene, etc., which will not jam at the top of the tank in the event the water in the tank is increased to move the float to the top of the tank.

My invention includes the various novel features of construction and arrangement hereinafter set forth.

FIG. 1 is an elevation view of a hydropneumatic tank of ordinary construction and in which a portion has been cut away to show in section the position of the water and air barrier float on the water.

FIG. 2 is an enlarged size plan view of the float indicated in FIG. 1.

FIG. 3 is a sectional view taken on the line 3—3 in FIG. 2.

Referring to said drawings; a hydropneumatic tank of the well-known ordinary construction, indicated generally at 1, includes a top closure 2 and a bottom closure 3. The top closure 2 and the bottom closure 3 are welded to the cylindrical portion of the tank to form an integral tank. The tank 1 is provided with a discharge outlet 5 and an inlet 6. The outlet 5 is adapted to be connected by suitable piping to the valve controlled dispensing outlets (not shown).

The inlet 6 is adapted to be connected by suitable piping and pipe fittings in the well-known customary manner to a pressure gauge and jet pump, the jet pump being provided with a pressure switch (none of which are shown). If the tank 1 is to be precharged in the manner mentioned above, I find it desirable to include a Schrader air valve in the piping connections. If a submersible type pump is used in the system, the inlet 6 is connected by suitable piping and pipe connections in the well-known manner to a pressure gauge, a submersible type pump, and a pressure switch installed on the wet line from the submersible type pump to the pressure switch (none of which is shown). A Schrader air valve may be included in the line, as a matter of convenience, for the purpose of precharging the tank 1. The foregoing is merely illustrative of well-known and customary systems which include a hydropneumatic tank.

As indicated in FIG. 1, an air barrier float means 8, placed in the tank before it has been completely welded to form an integral structure, floats on the water 7 in the lower portion of the tank 1, when the water 7 has been introduced into the tank by operation of the pump means. Assuming the tank 1 to be cylindrical in shape, the float 8 is circular and of less diameter than the internal diameter of the tank 1, so that the float may be raised or lowered in the tank 1 by the volume of the water 7 in the tank. The float 8 is of such diameter that clearance of the order of 3/16 of an inch 1/4 inch will exist between the circumference of the float 8 and the internal wall of the tank 1.

As best indicated in FIGS. 2 and 3, the float 8 is provided with cross ribs 9 and 10 which form a multiplicity of pockets 11 in conjunction with the tranverse web portion 12 of the float 8. The bottom of the web 12 is also provided with cross ribs 13 and 14 which form corresponding pockets 11 at the underside of the web.

The float 8 is formed of synthetic plastic material such as expanded polystyrene, or polyethylene, polypropylene, etc., which have a specific gravity of less than 1. My improved cross rib "waffle-like" construction not only assures that the expanded polystyrene, etc., float will not warp out of shape during use, but the cross rib members 13 and 14 of the float also will prevent the float 8 from jamming at the top of the tank 1 in the event the water 7 in the tank is increased in volume so as to move the float 8 when it is at the top of the tank 1. Accordingly deformation of the float 8 is prevented because the cross ribs 9 and 10 do not form a solid ring at the periphery of the float 8. Since there is no solid ring formed, a sealing effect cannot exist between the top of the float 8 and the convex top closure 2, and water can by-pass the float 8 when it is att he top of the tank 1. Accordingly there can be no fracturing of the float 8 even if it be pressed against the dome shaped top closure of the tank 1.

The multiplicity of pockets 11 formed by the cross rib members 13 and 14 on the underside of the float 8 at the float-water interface will insure that all the ribs 13 and 14 will be immersed slightly in the water 7 in the tank 1. Therefore a seal will be provided against any horizontal movement of air at the interface. Moreover, any air escaping from the water during the phase of lower pressure of the pressure cycle will be maintained in the pockets formed by the cross ribs 13 and 14 at the underside of the float 8.

I find it desirable to make the top and bottom sides of the float 8 symmetrical so that either side may be up or down when the float is initially installed in the tank 1 before it has had the top or bottom closure welded in the tank.

As is well-known, polystyrene has a very low water absorption and high mechanical strength. As expanded polystyrene has a specific gravity of less than 1, the float 8 will be submersed a negligible amount in the water 7 so that the pockets 11 formed by the cross rib members 13 and 14 are filled with air and become a multiplicity of air pockets. Of course, the portion of the tank, as indicated by A in FIG. 1, above the top of the float 8 to the internal wall of the head 2 is filled with air under pressure, as heretofore described.

I do not desire to limit myself to the details of construction as herein described, as it is obvious that various modifications may be made in my invention without departing from the essential features thereof as set forth in the appended claims.

I claim:

1. Free floating air barrier means for use in a hydropneumatic tank, comprising a substantially rigid air barrier float formed of synthetic plastic material which has a specific gravity of less than 1, said float having a transverse web portion, and a multiplicity of spaced apart intersecting ribs extending from both sides of said transverse web portion, said spaced apart intersecting ribs forming at both sides of said float a multiplicity of pockets open at their outer faces.

2. Free floating air barrier means for use in a hydropneumatic tank, comprising a substantially rigid air barrier float formed of expanded polystyrene which has a specific gravity of less than 1, said float having a transverse web portion, and a multiplicity of spaced apart intersection ribs extending from both sides of said transverse web portion, said spaced apart intersecting ribs forming at both sides of said float a multiplicity of rectangular pockets open at their outer faces.

3. Free floating air barrier means for use in a cylindrical hydropneumatic tank, comprising a circular substantially rigid air barrier float formed of expanded polystyrene which has a specific gravity of less than 1, said float having a slightly lesser diameter than the internal diameter of said tank, a transverse web portion formed in said float, and a multiplicity of spaced apart intersecting ribs extending from both sides of said transverse web portion, said spaced apart intersecting ribs forming at both sides of said float a multiplicity of rectangular pockets open at their outer faces.

4. Free floating air barrier means for use in a cylindrical hydropneumatic tank, comprising a circular substantially rigid air barrier float formed of synthetic plastic material which has a specific gravity of less than 1, said float having a slightly lesser diameter than the internal diameter of said tank, a transverse web portion formed in said float, and a multiplicity of spaced apart intersecting ribs extending from each side of said transverse web portion, said spaced apart intersecting ribs forming on both sides of said float a multiplicity of rectangular pockets open at their outer faces.

5. A pressure water reservoir comprising an integral tank; a free floating substantially rigid air barrier means within said tank and adapted to float on the top surface of water within said tank; said free floating air barrier means being comprised of a float formed of synthetic plastic material which has a specific gravity of less than 1, said float having a transverse web portion, and a multiplicity of spaced apart intersecting ribs extending from both sides of said transverse web portion, said spaced apart intersecting ribs forming at both sides of said float a multiplicity of pockets open at their outer faces.

6. A pressure water reservoir comprising an integral tank; a free floating substantially rigid air barrier means within said tank and adapted to float on the top surface of water within said tank; said free floating air barrier means being comprised of a float formed of expanded polystyrene which has a specific gravity of less than 1, said float having a transverse web portion, and a multiplicity of spaced apart intersecting ribs extending from both sides of said transverse web portion, said spaced apart intersecting ribs forming at both sides of said float a multiplicity of rectangular pockets open at their outer faces.

7. A pressure water reservoir comprising an integral tank; a free floating substantially rigid air barrier means within said tank and adapted to float on the top surface of water within said tank; said free floating air barrier means being comprised of a float formed of expanded polystyrene which has a specific gravity of less than 1, said float having a transverse central web portion, and a multiplicity of spaced apart intersecting ribs extending from each side of said transverse central web portion, said spaced apart intersecting ribs forming a multiplicity of pockets open at their outer faces on each side of said float.

(References on following page)

References Cited by the Examiner

UNITED STATES PATENTS

| | | | |
|---|---|---|---|
| 871,178 | 11/1907 | Ostrander | 161—123 |
| 1,116,414 | 11/1914 | Gould | 138—31 |
| 1,674,039 | 6/1928 | Glass | 220—26 |
| 2,283,439 | 5/1942 | Herman. | |
| 2,880,759 | 4/1959 | Wisman | 128—30 |
| 3,036,342 | 5/1962 | Fino | 220—26 X |
| 3,049,261 | 8/1962 | Wade et al. | 220—26 |
| 3,083,665 | 4/1963 | Steidley. | |

FOREIGN PATENTS 886,145   1/1962   Great Britain.

THERON E. CONDON, *Primary Examiner.*

JAMES R. GARRETT, *Assistant Examiner.*

UNITED STATES PATENT OFFICE
CERTIFICATE OF CORRECTION

Patent No. 3,273,741

September 20, 1966

Stuart F. Faunce

It is hereby certified that error appears in the above numbered patent requiring correction and that the said Letters Patent should read as corrected below.

Column 1, line 39, for "takn" read -- tank --; column 2, line 28, for "hydropenumatic" read -- hydropneumatic --; column 3, line 14, before "1/4 insert -- to --; line 32, for "8 when it is at the top of the tank 1. Accordingly" read -- up to the top closure 2 of the tank 1. Jamming or --; column 4, line 11, for "intersection" read -- intersecting --.

Signed and sealed this 29th day of August 1967.

(SEAL)
Attest:

ERNEST W. SWIDER
Attesting Officer

EDWARD J. BRENNER
Commissioner of Patents